United States Patent [19]
Lin

[11] Patent Number: 6,056,023
[45] Date of Patent: May 2, 2000

[54] METHOD FOR MAKING A TUBING HAVING LUBRICANT

[76] Inventor: Huai Yao Lin, No. 23, Avenue 30, Lane 221, Sec. 1, Chung Hwa Road, Long Ging Hsiang, Taichung Hsien, Taiwan

[21] Appl. No.: 09/289,810

[22] Filed: Apr. 12, 1999

[51] Int. Cl.$^7$ ....................................... B65B 1/04
[52] U.S. Cl. ................... 141/1; 29/530; 74/502.4
[58] Field of Search .................... 141/1, 11, 69; 29/527.1, 530, 234, 235; 74/500.5, 502.4–502.6

[56] References Cited

U.S. PATENT DOCUMENTS 3,693,250  9/1972  Brorein et al. ............................ 29/624
4,112,708  9/1978  Fukuda .

Primary Examiner—Steven O. Douglas
Attorney, Agent, or Firm—Charles E. Baxley, Esq.

[57] ABSTRACT

A method may apply a lubricant material into a tube of a tubing and includes mold device having an annular port for extruding a material to form a tube. The mold device includes a passage for supplying a lubricant material into the tube, and includes an aperture for supplying an air to apply the lubricant material onto the inner peripheral surface of the tube. A flexible coil and a cover sleeve are then applied onto the tube for forming the tubing. The wire may then be easily engaged into the tube of the tubing by the lubricant material.

2 Claims, 2 Drawing Sheets

METHOD FOR MAKING A TUBING HAVING LUBRICANT

BACKGROUND OF THE INVENTION

1. Field of the Invention

The present invention relates to a method, and more particularly to a method for making a tubing having a lubricant material engaged therein.

2. Description of the Prior Art

Typically, cycles and vehicles comprise a number of tubes having wires engaged therein for transmission or for actuation purposes. For example, the brake cables, the clutch cables, the cables coupled to the meters, and the fuel cables each includes a outer tube and a wire engaged into the outer tube. For allowing the wires to be freely and smoothly rotated and moved within the tube, a grease applying device is normally provided for filling the grease into the tube from the ends of the tube or for applying the grease on the outer surface of the wire before the wire is engaged into the tube. However, the grease may not be uniformly applied between the tube and the wire.

The present invention has arisen to mitigate and/or obviate the afore-described disadvantages of the conventional method for applying the grease into the tubes or between the tube and the wire.

SUMMARY OF THE INVENTION

The primary objective of the present invention is to provide a method for applying a lubricant material into a tube and for allowing the lubricant material to be uniformly applied between the tube and the wire.

In accordance with one aspect of the invention, there is provided a method for applying a lubricant material into a tube of a tubing, the method comprising providing a mold device having an annular port and having a passage formed therein, extruding a material through the annular port to form a tube, the tube including an inner peripheral surface, supplying a lubricant material through the passage and into the tube, applying the lubricant material onto the inner peripheral surface of the tube, applying a flexible coil onto the tube, and applying a cover sleeve onto the flexible coil and to form the tubing.

The mold device includes an aperture formed therein directed into the tube for applying an air into the tube and for blowing the lubricant material onto the inner peripheral surface of the tube.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 6:
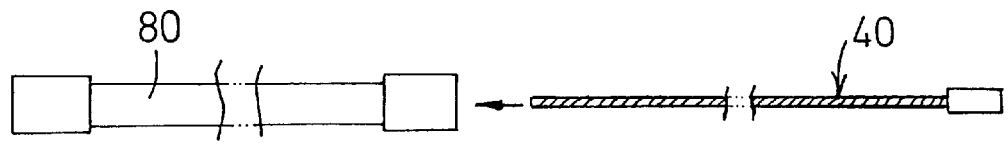
FIG. 6 is a partial plane view illustrating the engagement of the wire into the tubing.

Referring to the drawings, a method in accordance with the present invention is provided for making a tubing 80 having a lubricant material 10 engaged therein before the wire 40 is engaged into the tubing 80, for allowing the lubricant material 10 to be uniformly applied between the tubing 80 and the wire 40. The tubing 80 to be made by the method in accordance with the present invention comprises a tube 70 engaged in a flexible coil 74 which is engaged in a soft outer cover sleeve 76. In which a lubricant material 10 is to be applied into the tube 70 for allowing the wire 40 to be easily engaged into the tube 70 of the tubing 80 (FIG. 6).

Figure 1:
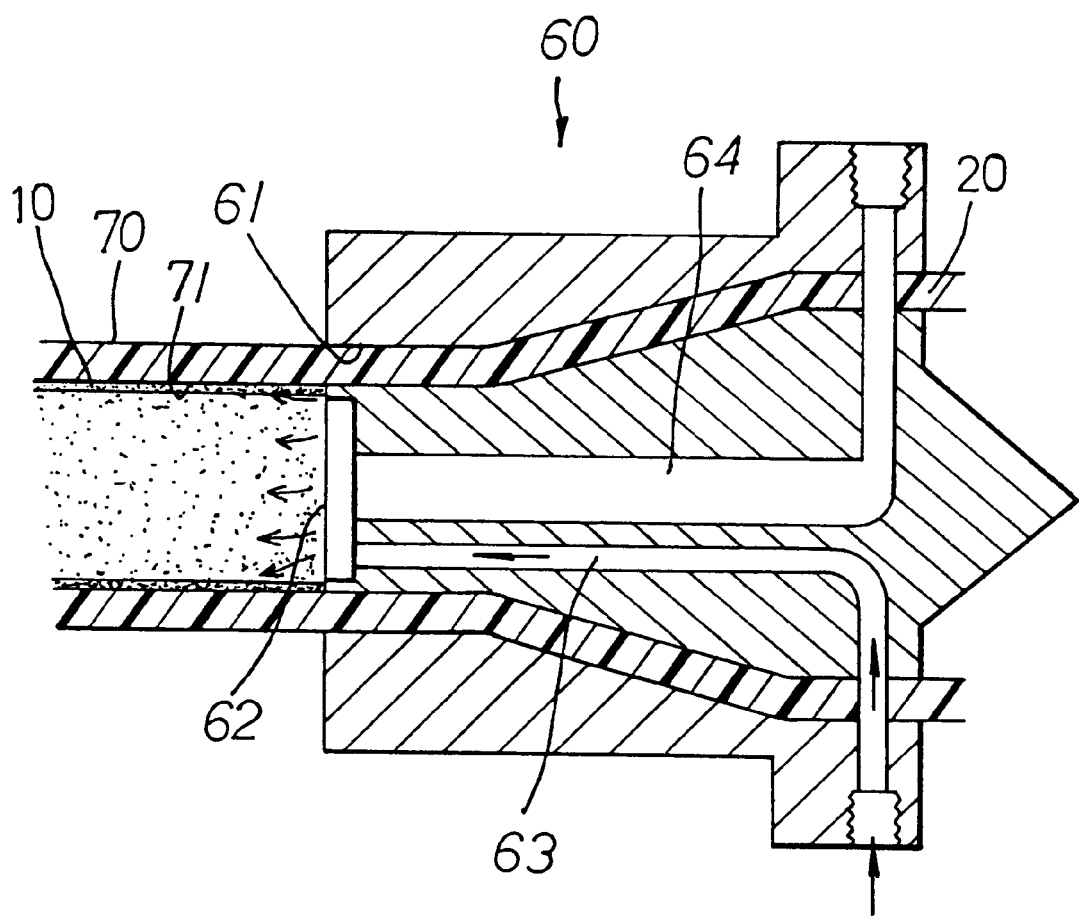
FIG. 1 is a partial cross sectional view illustrating a mold device for applying a grease material into a tube.
Figure 2:
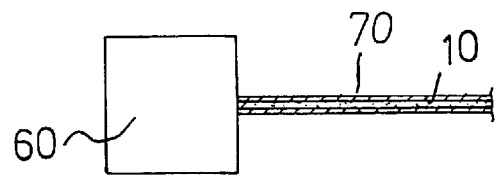
FIG. 2 is a partial plane view illustrating the formation of the tube having the lubricant material applied therein.

Referring to FIGS. 1 and 2, a mold device 60 of such as an extruding machine is provided for forming or extruding the tube 70 and comprises an annular port 61 formed therein for allowing a melted material 20 to be extruded out through the port 61 to form the tube 70. The tube 70 includes an inner peripheral surface 71 to be applied with the lubricant material 10. The mold device 60 further includes a passage 63 for supplying the lubricant material 10 into the tube 70 and includes an aperture 64 formed therein for supplying air into the tube 70 and for uniformly blowing the lubricant material 10 onto the inner peripheral surface 71 of the tube 70. The mold device 60 includes an exit 62 where the passage 63 and the aperture 64 terminate. The mold device 60 is normally heated to melt the material 20 and to melt the lubricant material 10 for allowing the material 20 to be extruded out through the port 61 of the mold device 60 and for allowing the lubricant material 10 to be applied into the tube 70.

It is to be noted that the lubricant material 10 may be applied into the inner peripheral surface 71 of the tube 70 as a number of dots, or a number of lines, or one or more helical lines, or a cylindrical plane, depending on the shape of the exit 62 of the mold device 60.

Figure 3:
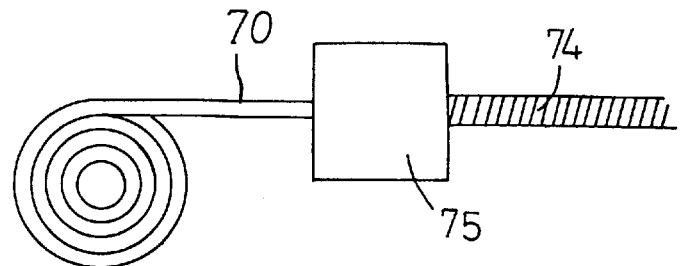
FIG. 3 is a partial plane view illustrating the formation of a flexible coil onto the tube.
Figure 4:
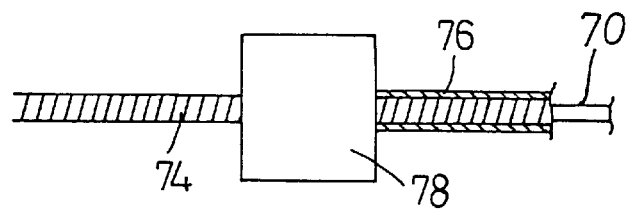
FIG. 4 is a partial plane view illustrating the formation of a cover sleeve onto the flexible coil.
Figure 5:
FIG. 5 is a partial plane view showing a portion of the tubing that may be formed as an endless tubing.

Referring next to FIG. 3, a flexible coil 74 is then applied onto the outer peripheral portion of the tube 70 with a coil forming machine 75. Referring next to FIG. 4, a soft outer cover sleeve 76 is then applied onto the outer peripheral surface of the flexible coil 74 by another machine, such as another extruding machine 78, in order to form the tubing 80 as shown in FIG. 5. The tubing 80 may be formed into an endless tubing. As shown in FIG. 6, the tubing 80 may then be cut into any required length according to the user's need, before the wire 40 is engaged into the tube 70 of the tubing 80.

Accordingly, the method in accordance with the present invention may be used for uniformly applying a lubricant material into a tube and for allowing the lubricant material to be uniformly applied between the tube and the wire that is engaged into the tube.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for applying a lubricant material into a tube of a tubing, said method comprising:

providing a mold device having an annular port and having a passage formed therein, extruding a material through said annular port to form a tube, said tube including an inner peripheral surface, supplying a lubricant material through said passage and into said tube, applying said lubricant material onto said inner peripheral surface of said tube, applying a flexible coil onto said tube, and applying a cover sleeve onto said flexible coil and to form said tubing.

2. The method according to claim 1, wherein said mold device includes an aperture formed therein directed into said tube for applying an air into said tube and for blowing said lubricant material onto said inner peripheral surface of said tube.

* * * * *